United States Patent
Kumagai

(10) Patent No.: US 7,363,483 B2
(45) Date of Patent: Apr. 22, 2008

(54) SYSTEM FOR REBOOTING RELAY APPARATUS BASED ON DETECTION OF COMPLETELY NO COMMUNICATION ESTABLISHMENT DATA PRESENCE

(75) Inventor: Yuei Kumagai, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 353 days.

(21) Appl. No.: 11/013,989

(22) Filed: Dec. 16, 2004

(65) Prior Publication Data
US 2006/0041737 A1   Feb. 23, 2006

(30) Foreign Application Priority Data
Aug. 19, 2004   (JP)   .............. 2004-239935

(51) Int. Cl.
*G06F 9/24* (2006.01)
(52) U.S. Cl. .......................... 713/2; 709/224
(58) Field of Classification Search ........ 713/2; 709/224
See application file for complete search history.

(56) References Cited

U.S. PATENT DOCUMENTS

| 6,192,230 B1 * | 2/2001 | van Bokhorst et al. .. 455/343.3 |
| 6,446,201 B1 * | 9/2002 | Gunther ........................ 713/1 |
| 2003/0012182 A1 | 1/2003 | Sato |
| 2003/0174664 A1 * | 9/2003 | Benveniste ................. 370/317 |

FOREIGN PATENT DOCUMENTS

| JP | 10-133963 | 5/1998 |
| JP | 2000-31998 | 1/2000 |
| JP | 3325785 | 7/2002 |
| JP | 2003-8575 | 1/2003 |
| JP | 2003-32277 | 1/2003 |
| JP | 2003-196100 | 7/2003 |

* cited by examiner

*Primary Examiner*—Thuan Du
(74) *Attorney, Agent, or Firm*—Katten Muchin Rosenman LLP

(57) ABSTRACT

A relay apparatus enables automatic execution of the reboot process after a controller has detected a discontinuance of data. Accordingly, data in a communication is reliably prevented from destruction. Moreover, the reboot process can be achieved with simple operations. In addition, an operator is allowed to finish operations for changing the configuration of the relay apparatus, for example, before the data communications have actually been discontinued. The operator can finish the operation within the business hours. A burden of the operator can be lightened.

9 Claims, 4 Drawing Sheets

SYSTEM FOR REBOOTING RELAY APPARATUS BASED ON DETECTION OF COMPLETELY NO COMMUNICATION ESTABLISHMENT DATA PRESENCE

BACKGROUND OF THE INVENTION

1. Field of the Invention

The present invention relates to a relay apparatus designed to relay data for communication. In particular, the present invention relates to a relay apparatus utilized in a computer network system such as a local area network (LAN), for example.

2. Description of the Prior Art

A relay apparatus such as a so-called wireless LAN access point is often utilized in a computer network system such as a wireless LAN, for example. Some computers are connected to the wireless LAN access point through wireless communications. Data communications can thus be established between the computers. On the other hand, a server computer is connected to the wireless LAN access point through wires. The server computer is connected to a network such as the Internet, for example. The computers are allowed to access the server computer or the Internet through the wireless LAN access point.

Communication channels are configured to realize the wireless communications in the wireless LAN access point. Changing the configuration of the communication channels should be accompanied by a reboot process. The reboot process discontinues or interrupts data communications. The discontinuance of the data communications forces the data to be lost. An operator has to confirm whether the data is present or not prior to the reboot process. As a result, the operator is not allowed to carry out the reboot process during the office hours. The operator has to carry out the reboot process off the office hours, such as around midnight, for example.

SUMMARY OF THE INVENTION

It is accordingly an object of the present invention to provide a relay apparatus capable of reducing burdensome operations for an operator. It is an object of the present invention to provide a method of rebooting and software programs contributing to reduction in the burdensome operations for an operator of the relay apparatus.

According to a first aspect of the present invention, there is provided a relay apparatus comprising: a communication controller designed to relay data for communication; and a controller executing a reboot process when the controller detects no data for communications. The relay apparatus enables automatic execution of the reboot process after the controller has detected a discontinuance of data. Accordingly, data in a communication is reliably prevented from destruction. Moreover, the reboot process can be achieved with simple operations. In addition, an operator is allowed to finish operations for changing the configuration of the relay apparatus, for example, before the data communications have actually been discontinued. The operator can finish the operation within the business hours. A burden of the operator can be lightened.

The controller may start monitoring the presence of the data for communication in response to reception of a request signal for start of the reboot process. The operator may transmit the request signal for start of the reboot process to the relay apparatus, for example. The relay apparatus is allowed to start monitoring the presence of the data when the relay apparatus has received the request signal. When the controller has detected a discontinuance of the data, the reboot process is executed in the relay apparatus. An operator is allowed to finish operations for changing the configuration of the relay apparatus, for example, before the data communications have actually been discontinued. The operator can finish the operation within the office hours. A burden of the operator can be lightened.

The relay apparatus may allow the controller to transmit a signal notifying the execution of the reboot process. If the signal for notifying is transmitted to a communication apparatus establishing data communications with the relay apparatus, for example, a user of the communication apparatus is allowed to notice the execution of the reboot process. The user can be recommended to finish the communication. The discontinuance of the data communications can correspondingly be achieved earlier in the relay apparatus. The configuration of the relay apparatus can be changed in a minute, for example. The controller may start monitoring the presence of the data for communication in response to reception of a request signal for start of the reboot process. The controller may be designed to hold the reboot process when it detects the data for communication. The controller may be designed to execute the reboot process when it detects no data for communication after it has held the reboot process.

According to a second aspect of the present invention, there is provided a method of rebooting a relay apparatus, comprising: detecting no data for communication; and executing a reboot process in response to detection of no data for communication. The method enables automatic execution of the reboot process in the relay apparatus when no data for communication is detected. Accordingly, data in a communication is reliably prevented from destruction. Moreover, the reboot process can be achieved with simple operations. In addition, an operator is allowed to finish operations for changing the configuration of the relay apparatus, for example, before the data communications have actually been discontinued. The operator can finish the operation within the office hours. A burden of the operator can be lightened.

The method may further comprise: receiving a request signal for start of the reboot process; and starting monitoring the presence of the data for communication in response to reception of the request signal for start of the reboot process. The operator may transmit the request signal for start of the reboot process to the relay apparatus, for example. The relay apparatus is allowed to start monitoring the presence of the data when the relay apparatus has received the request signal. When a discontinuance of the data has been detected, the reboot process is executed in the relay apparatus. An operator is allowed to finish operations for changing the configuration of the relay apparatus, for example, before the data communications have actually been discontinued. The operator can finish the operation within the office hours. A burden of the operator can be lightened.

The method may further comprise transmitting a signal notifying the execution of the reboot process. As described above, if the signal for notifying is transmitted to a communication apparatus establishing data communications with the relay apparatus, for example, a user of the communication apparatus is allowed to notice the execution of the reboot process. The user can be recommended to finish the communication. The discontinuance of the data communications can correspondingly be achieved earlier in the relay apparatus. The configuration of the relay apparatus can be changed in a minute, for example. In this case, the method may further comprise: receiving a request signal for start of the reboot process; and holding execution of the reboot process when the data for communication is detected.

According to a third aspect of the present invention, there is provided a computer-readable storage medium containing program instructions for controlling a relay apparatus, comprising: computer program code causing a processor to detect no data for communication; and computer program code causing a processor to execute a reboot process in response to detection of no data for communication. The computer program codes may be installed in the relay apparatus. The processor of the relay apparatus may implement a series of processes in accordance with the computer program codes.

The computer program codes enable automatic execution of the reboot process in the aforementioned manner when no data for communication is detected. Accordingly, data in a communication is reliably prevented from destruction. Moreover, the reboot process can be achieved with simple operations. In addition, an operator is allowed to finish operations for changing the configuration of the relay apparatus, for example, before the data communications have actually been discontinued. The operator can finish the operation within the office hours. A burden of the operator can be lightened.

The computer-readable storage medium may further comprise: computer program code causing a processor to receive a request signal for start of the reboot process: and computer program code causing a processor to start monitoring presence of data for communication in response to reception of a request signal for start of the reboot process. The operator may transmit the request signal for start of the reboot process to the relay apparatus, for example. The relay apparatus is allowed to start monitoring the presence of the data when the relay apparatus has received the request signal. When a discontinuance of the data has been detected, the reboot process is executed in the relay apparatus. An operator is allowed to finish operations for changing the configuration of the relay apparatus, for example, before the data communications have actually been discontinued. The operator can finish the operation within the office hours. A burden of the operator can be lightened.

The computer-readable storage medium may further comprise computer program code causing a processor to transmit a signal notifying execution of said reboot process. As described above, if the signal for notifying is transmitted to a communication apparatus establishing data communications with the relay apparatus, for example, a user of the communication apparatus is allowed to notice the execution of the reboot process. The user can be recommended to finish the communication. The discontinuance of the data communications can correspondingly be achieved earlier in the relay apparatus. The configuration of the relay apparatus can be changed in a minute, for example. In this case, the computer-readable storage medium may further comprise: computer program code causing a processor to receive a request signal for start of the reboot process: and computer program code causing a processor to hold execution of the reboot process when the data for communication is detected.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
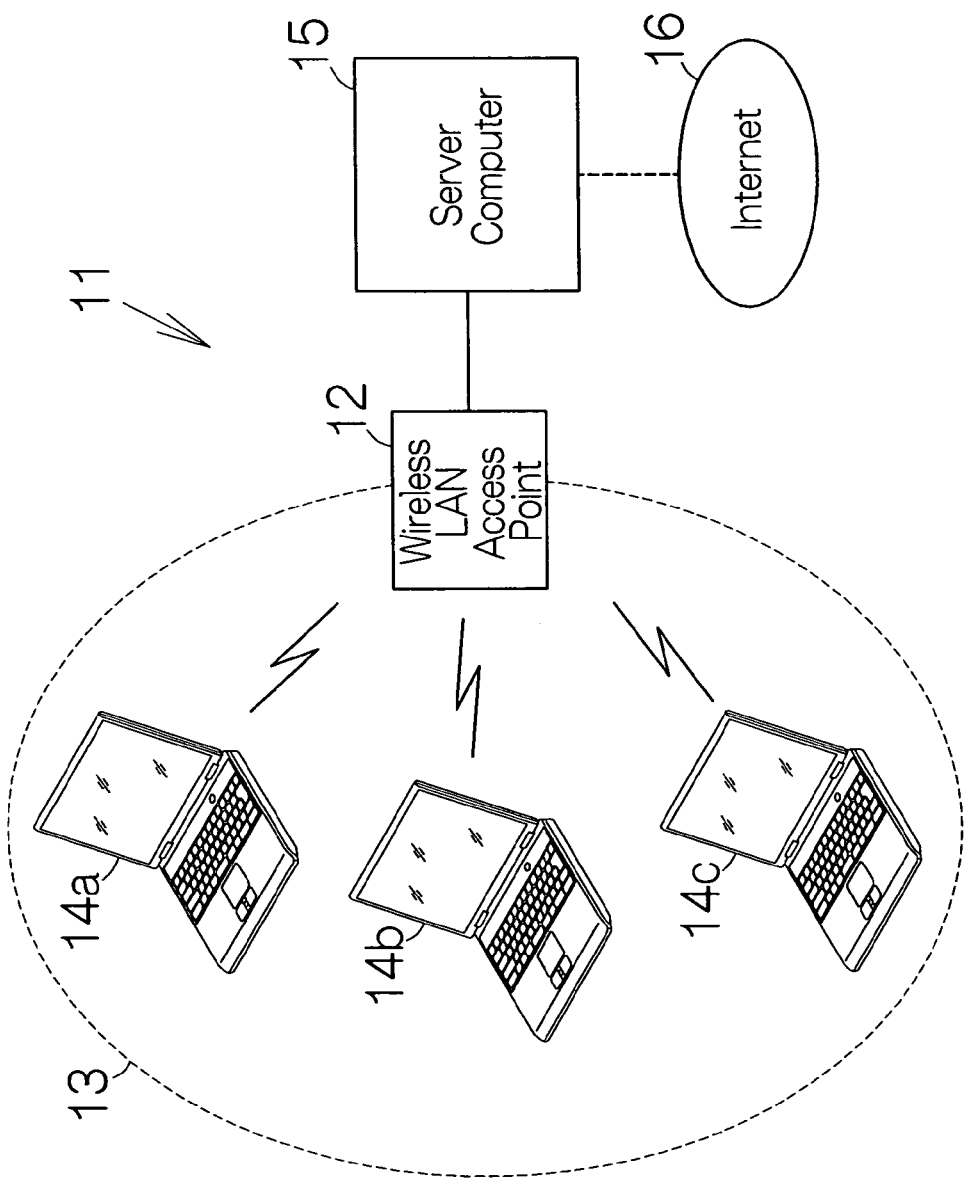
FIG. 1 is a schematic view illustrating the structure of a computer network system.

FIG. 1 schematically illustrates the structure of a computer network system 11 according to an embodiment of the present invention. The computer network system 11 includes a relay apparatus or wireless LAN access point 12. The wireless LAN access point 12 is designed to establish wireless communications with communication terminals or personal computers 14*a*, 14*b*, 14*c* within a cell 13 extending over a predetermined range. Data can be exchanged between the wireless LAN access point 12 and the personal computers 14*a*, 14*b*, 14*c* through the wireless communications.

A server computer 15 is connected to the wireless LAN access point 12. The server computer 15 is designed to establish a wired communication with the wireless LAN access point 12. Data can be exchanged between the wireless LAN access point 12 and the server computer 15 through the wired communication. The wireless LAN access point 12 serves to relay data between the personal computers 14*a*, 14*b*, 14*c* and the server computer 15. The wireless LAN access point 12, the personal computers 14*a*, 14, 14*c*, and the server computer 15 in combination establish a wireless local area network (LAN). Personal computers, not shown, may be connected to the server computer 15 through a hub so as to establish wired communications with the server computer 15, for example. The server computer 15 and the personal computers may thus establish a wired LAN.

The server computer 15 is connected to the Internet 16 through a router, for example. The server computer 15 is allowed to transmit data from the personal computers 14*a*, 14*b*, 14*c* toward the Internet 16. Likewise, the server computer 15 is allowed to transmit data from the Internet 16 toward the personal computers 14*a*, 14*b*, 14*c*. The data may be generated pursuant to a protocol such as HTTP, for example. The data may be transferred in the form of a packet or packets. Alternatively, any types of communications may be employed to transfer data.

Figure 2:
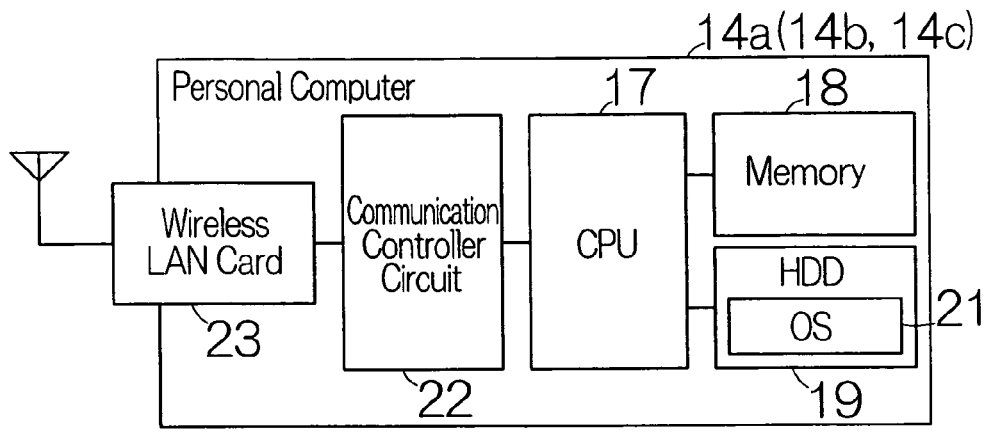
FIG. 2 is a block diagram illustrating the structure of a personal computer.

As shown in FIG. 2, the individual personal computer 14*a*, 14*b*, 14*c* includes a central processing unit (CPU) 17, and a memory 18 connected to the CPU 17, and a hard disk drive (HDD) 19 likewise connected to the CPU 17. The HDD 19 holds therein a basic software such as an operating system (OS) 21, application softwares, and various data. The CPU 17 is designed to execute the OS 21 and the application software or softwares temporarily stored in the memory 18, for example. Various data is temporarily stored in the memory 18 when the CPU 21 executes the OS 21 and the application software or softwares.

A communication controller circuit 22 is also connected to the CPU 17. The communication controller circuit 22 is designed to establish a communication with the wireless LAN access point 12. A wireless LAN card 23 is connected to the communication controller circuit 22. The wireless LAN card 23 is designed to establish wireless communications. The wireless LAN card 23 may be inserted into a slot of the personal computer 14a, 14b, 14c, for example. The communication controller circuit 22 is thus capable of establishing a wireless communication with the wireless LAN access point 12 through the wireless LAN card 23. The communication controller circuit 22 is designed to derive data from the packet or packets received from the wireless LAN access point 12. The derived data is transferred to the CPU 17. To the contrary, the communication controller circuit 22 is capable of generating a packet or packets from data received from the CPU 17. The generated packet or packets is transmitted to the wireless LAN access point 12.

Figure 3:
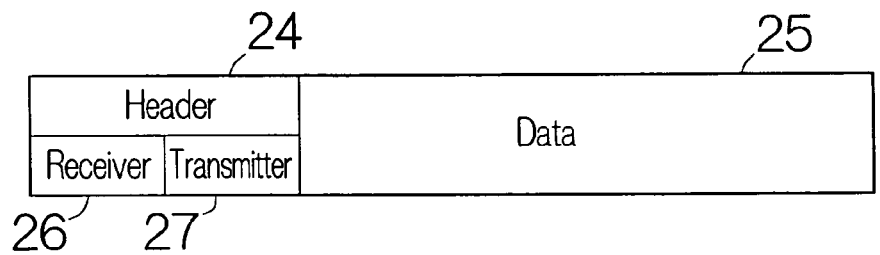
FIG. 3 is a schematic view of the structure of a packet.

As conventionally known, data is exchanged in a packet or packets between the personal computers 14a, 14b, 14c and the wireless LAN access point 12, for example. As shown in FIG. 3, the individual packet includes a header 24 and data 25. The header 24 includes information 26 specifying the identification of a receiver as well as information 27 specifying the identification of a transmitter of the packet. The information 26, 27 includes a MAC (Media Access Control) address and an IP (Internet Protocol) address. The MAC address and the IP address are individually allocated to the personal computers 14a, 14b, 14c, the wireless LAN access point 12, and the server computer 15. The data 23 includes various types of data.

Figure 4:
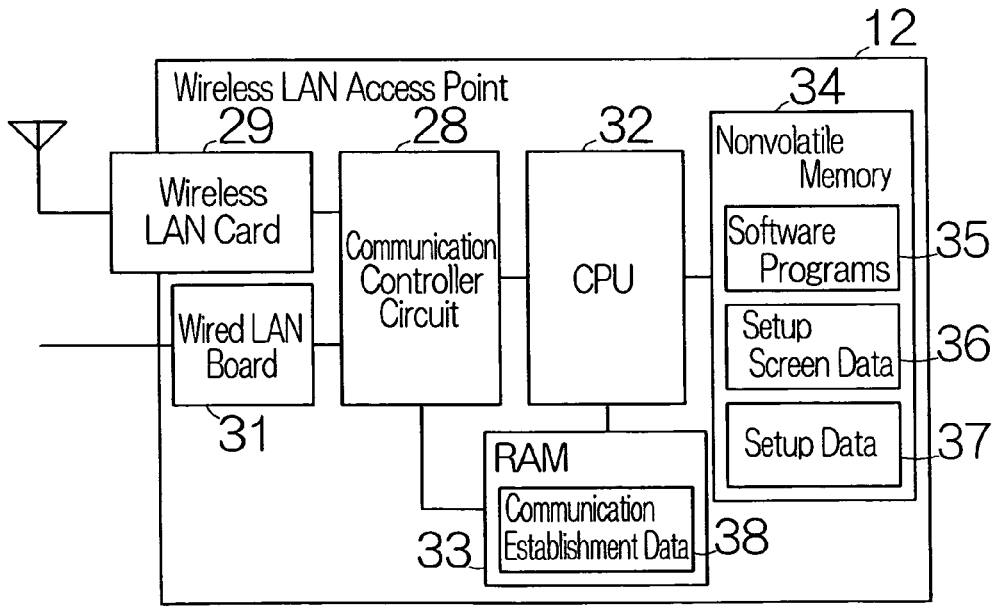
FIG. 4 is a block diagram illustrating the structure of a wireless LAN access point.

As shown in FIG. 4, the wireless LAN access point 12 includes a communication controller circuit 28. The communication controller circuit 28 is designed to establish data communications with the personal computers 14a, 14b, 14c and the server computer 15. A wireless LAN card 29 is connected to the communication controller circuit 28. The wireless LAN card 29 is designed to establish wireless communications. The wireless LAN card 29 may be inserted into a slot of the wireless LAN access point 12, for example. The communication controller circuit 28 is thus allowed to establish wireless communications with the personal computers 14a, 14b, 14c in this manner. Likewise, a wired LAN board 31 is connected to the communication controller circuit 28. The wired LAN board 31 is designed to establish wired communications. A LAN cable may be connected to the wired LAN board 31 through a connecter, not shown, for example. The communication controller circuit 28 is thus allowed to establish wired communications with the server computer 15.

The communication controller circuit 28 transmits a packet received from the personal computers 14a, 14b, 14c to the server computer 15. On the other hand, the communication controller circuit 28 transmits a packet received from the server computer 15 to the personal computers 14a, 14b, 14c. In addition, the communication controller circuit 28 is also capable of transmitting a packet from any one of the personal computers 14a, 14b, 14c to any other one of the personal computers 14a, 14b, 14c. The communication controller circuit 28 is allowed to relay data for communications between the personal computers 14a, 14b, 14c and the server computer 15 as well as between the personal computers 14a, 14b, 14c.

A CPU 32 is connected to the communication controller circuit 28. A random access memory (RAM) 33 and a nonvolatile memory 34 are both connected to the CPU 33. The nonvolatile memory 34 may be a flash memory, for example. The nonvolatile memory 34 holds therein software programs 35 and a setup screen data 36. The CPU 32 is allowed to utilize the working area of the RAM 33 so as to implement the software programs 35. The software programs include a software program for controlling a relay apparatus according to the present invention. The software program for controlling a relay apparatus will be described later in detail.

The setup screen data 36 specifies data utilized to change the configuration of the wireless LAN access point 12. The setup screen data 36 can be displayed on a web browser, for example. Various parameters or settings of the configuration can be changed in the wireless LAN access point 12 in accordance with the display of the setup screen data 36. The setup screen data 36 reflects a setup data 37 of the wireless LAN access point 12. The nonvolatile memory 34 holds the setup data 37 therein. The setup data 37 includes data related to a system of LAN, such as a bandwidth or telecommunication channels, data related to the network, such as the MAC address and the IP address, data related to the security, such as a WEP and a MAC address filtering.

Here, the communication channel should be commonly set for the wireless LAN access point 12 and the personal computers 14a, 14b, 14c. In general, the wireless LAN access point 12 is allowed to establish a plurality of communication channels. When other wireless LAN is structured in the vicinity of the wireless access point 12 and the personal computers 14a, 14b, 14c, for example, the wireless communications between the wireless access point 12 and the personal computers 14a, 14b, 14c should be prevented from interference with the other wireless LAN. In this case, the wireless access point 12 and the personal computers 14a, 14b, 14c simply employ a communication channel different from that of the other wireless LAN.

The RAM 33 temporarily holds a communication establishment data 38. The communication establishment data 38 specifies establishment of a communication between the personal computers 14a, 14b, 14c and the server computer 15. Here, the communication establishment data 38 corresponds to the MAC address included in the information 27 identifying a transmitter in a packet. The communication controller circuit 28 derives the MAC address of a transmitter from a packet transferred between the personal computers 14a, 14b, 14c and the server computer 15 in accordance with a predetermined software program. The derived MAC address is stored in the RAM 33 as the communication establishment data 38.

The CPU 32 is designed to monitor the presence of the communication establishment data 38 in the RAM 33 based on the software realized based on the software program 35. The CPU 32 is allowed to detect the presence of a packet in a communication channel based on the monitoring. When the CPU 32 detects the communication establishment data 38 in the RAM 33, the CPU 32 determines that a packet is exchanged between the personal computers 14a, 14b, 14c and the server computer 15. On the other hand, when the CPU 32 fails to find the communication establishment data 38 in the RAM 33, the CPU 32 determines that no packet is transferred between the personal computers 14a, 14b, 14c and the server computer 15.

Figure 5:
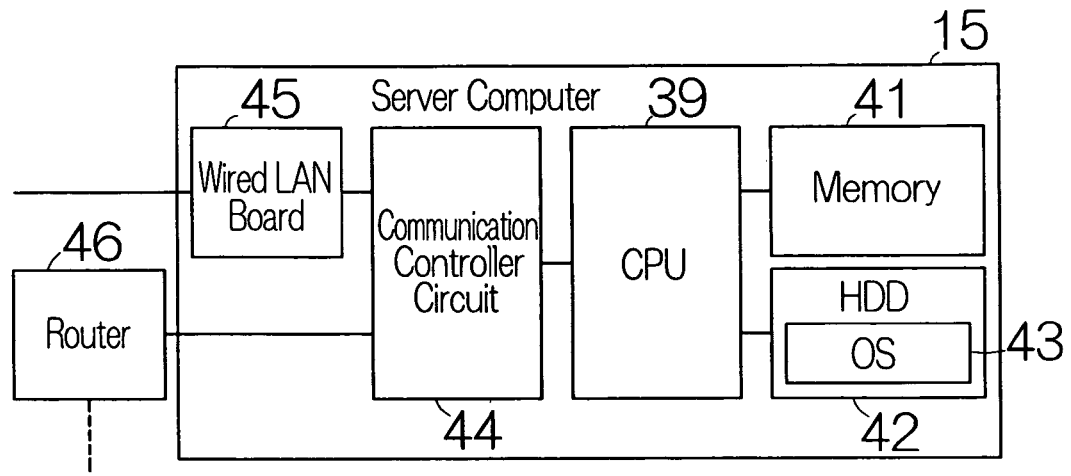
FIG. 5 is a block diagram illustrating the structure of a server computer.

As shown in FIG. 5, the server computer 15 includes a CPU 39, a memory 41 connected to the CPU 39, and a HDD 42 likewise connected to the CPU 39, for example. The HDD 42 holds therein a basic software such as an operating system (OS) 43, application softwares, and various data. The CPU 39 is allowed to implement predetermined processings based on an application software or softwares temporarily stored in the memory 41, for example. Various data is temporarily stored in the memory 41 during implementation of the application softwares.

The HDD 42 holds the application software such as a web browser, for example. The CPU 39 is allowed to display various information on the screen of a display, not shown, in the server computer 15 based on the operations of the web browser. Here, the CPU 39 serves to display the setup data 36 and the communication establishment data 38 received from the wireless LAN access point 12. An operator of the wireless LAN access point 12 is allowed to observe the communication establishment data 38 and various parameters and settings of the setup data 37.

A communication controller circuit 44 is connected to the CPU 39. A wired LAN board 45 is connected to the communication controller circuit 44. The wired LAN board 45 is designed to establish wired communications. The communication controller circuit 44 is thus allowed to establish a wired communication with the wireless LAN access point 12. At the same time, the communication controller circuit 44 is connected to the Internet 16 through a router 46. The communication controller circuit 44 is allowed to derive data received from the wireless LAN access point 12 or the Internet 16. The derived data is transferred to the CPU 39. To the contrary, the communication controller circuit 44 is allowed to generate a packet from data received from the CPU 39. The generated packet is transferred to the wireless LAN access point 12 or the Internet 16.

Now, assume that the personal computer 14a is turned on. The OS 21 is temporarily stored in the memory 18 based on a predetermined software in the personal computer 14a. The OS 21 is booted in this manner. At the same time, the electric power is supplied to the wireless LAN card 23. The communication controller circuit 22 generates a request signal for establishment of a communication based on the OS 21. The request signal may include the SSID (Service Set Identification) or the MAC address of the personal computer 14a. The generated request signal is transferred to the wireless LAN access point 12 through the wireless LAN card 23.

The communication controller circuit 28 generates a permission signal for establishment of a communication in response to reception of the request signal in the wireless LAN access point 12. The generated permission signal is transferred to the personal computer 14a through the wireless LAN card 29. The communication controller circuit 22 receives the permission signal in the personal computer 14a. A connection or link is established between the personal computer 14a and the wireless LAN access point 12 in this manner. The exchange of the request signal and the permission signal may periodically be conducted.

Otherwise, the request signal may be transferred to the server computer 15 through the wireless LAN access point 12. The server computer 15 may previously hold the SSID or the MAC address of the personal computer 14a in the HDD 42. The OS 43 judges whether or not the SSID or MAC address included in the request signal is identical to the SSID or the MAC address stored in the HDD 42 in response to the reception of the request signal. When the SSIDs or MAC addresses are conformed to each other, the OS 43 may transmit the permission signal to the personal computer 14a. Alternatively, the server computer 15 may authenticate the personal computer 14a for establishment of a link.

Next, assume that data is transferred from the personal computer 14a to the server computer 15. The CPU 17 generates data to be transmitted and the information 26, 27 based on implementation of a predetermined software program in the personal computer 14a. The generated data and information 26, 27 are transferred to the communication controller circuit 22. The information 26 includes the IP address and the MAC address of the server computer 15. The information 27 includes the IP address and the MAC address of the personal computer 14a. The communication controller circuit 22 generates packets based on data from the CPU 17. As described above, the header of each packet includes the information 26, 27. The communication controller circuit 22 transmits the packets to the wireless LAN access point 12 through the wireless LAN card 23.

The communication controller circuit 28 observes the information 26 of the packets received from the personal computer 14a in the wireless LAN access point 12. Here, since the MAC address of the server computer 15 is included in the information 26, the communication controller circuit 28 transmits the packets to the server computer 15 through the wired LAN board 31. The communication controller circuit 28 derives the MAC address of the information 27 from the packet. The communication controller circuit 28 stores the derived MAC address in the RAM 33 as the communication establishment data 38 based on implementation of a predetermined software program. The aforementioned processings may be implemented every time the communication controller circuit 28 receives the packet, for example.

The communication controller circuit 44 observes the information 26 included in the packets received from the wireless LAN access point 12 in the server computer 15. Since the IP address and the MAC address of the server computer 15 are included in the information 26, the communication controller circuit 44 derives the data 25 from the packets received from the wireless LAN access point 12. The CPU 39 restores the original data from the derived data 25 based on implementation of a predetermined software program. The data is thus transmitted from the personal computer 14a to the server computer 15.

The communication controller circuit 28 erases the communication establishment data 38 in the RAM 33 based on a predetermined software in the wireless LAN access point 12 after a predetermined time period has elapsed. Here, the communication establishment data 38 is erased in five minutes after when the communication establishment data 38 has been stored in the RAM 33, for example. The time period may be set in accordance with a predetermined software program.

Next, assume that the wireless LAN access point 12 is turned on. Electric power is supplied to the wireless LAN card 29 and the wired LAN board 31. The communication controller circuit 28 then waits for a packet transmitted from the personal computers 14a, 14b, 14c and the server computer 15. The communication controller circuit 28 operates to pass the packets in accordance with the setup data 37 stored in the nonvolatile memory 34. The aforementioned processings are repeated to transfer the packets.

Next, assume that the configuration is to be changed in the wireless LAN access point 12. Here, the communication establishment data 38 is held in the RAM 33 in the wireless LAN access point 12. Exchange of packets is already established between the personal computer 14a and the server computer 15, for example. The CPU 32 executes the software program 35 for controlling a relay apparatus stored in the nonvolatile memory 34 in the wireless LAN access point 12. The CPU 32 is designed to execute various processings based on implementation of the software program for controlling a relay apparatus.

Figure 6:
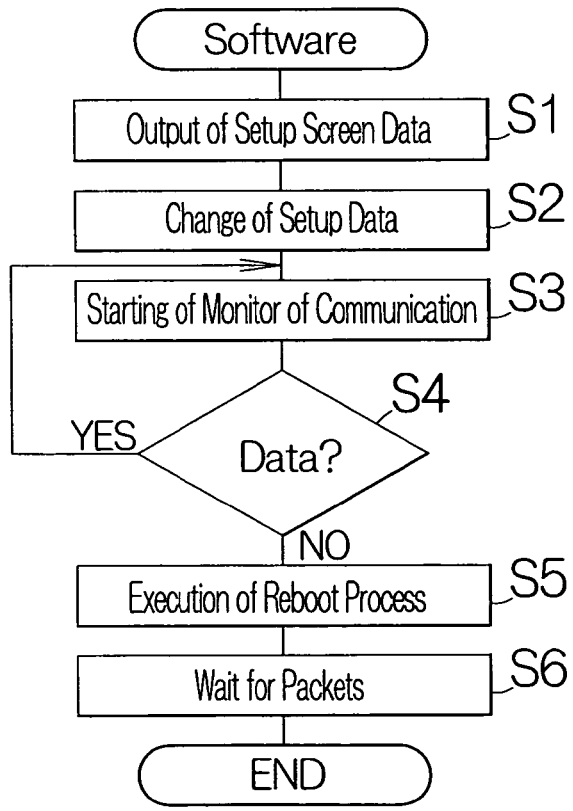
FIG. 6 is a flowchart illustrating an example of the processings of a software installed in the wireless LAN access point.
Figure 7:
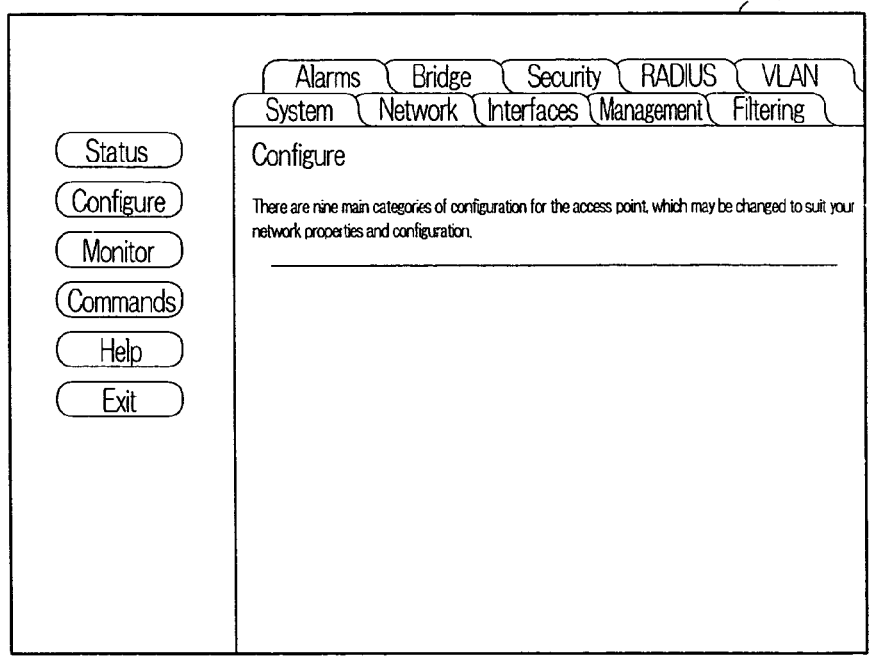
FIG. 7 is a schematic view illustrating the setup screen of the wireless LAN access point.

The operator of the wireless LAN access point 12 operates to boot the web browser in the server computer 15. The IP address of the wireless LAN access point 12 is input in the address bar of the web browser, the CPU 39 of the server computer 15 transmits the request signal for transmitting the setup screen data 36 to the wireless LAN access point 12. As shown in FIG. 6, the CPU 32 in the wireless LAN access point 12 transmits the setup screen data 36 to the server computer 15 in response to the reception of the request signal at step S1. As shown in FIG. 7, a setup screen 47 is displayed on the web browser in the server computer 15.

Subsequently, the operator is allowed to change various parameters and settings of the configuration on the setup screen 47 based on the manipulation of input devices, for example. Here, the operator changes the communication channel, for example. When the communication channel is to be changed, the CPU 39 of the server computer 15 transmits the request signal for change of communication channels to the wireless LAN access point 12. The CPU 32 operates to change the setup data in the wireless LAN access point 12 in response to reception of the request signal at step S2. The CPU 32 temporarily stores the changed setup data in the RAM 33. Here, the existing setup data 37 is left unchanged in the nonvolatile memory 34. The communication controller circuit 28 utilizes the existing setup data 37 in transferring the packet until the existing setup data 37 is overwritten with the changed setup data.

Figure 8:
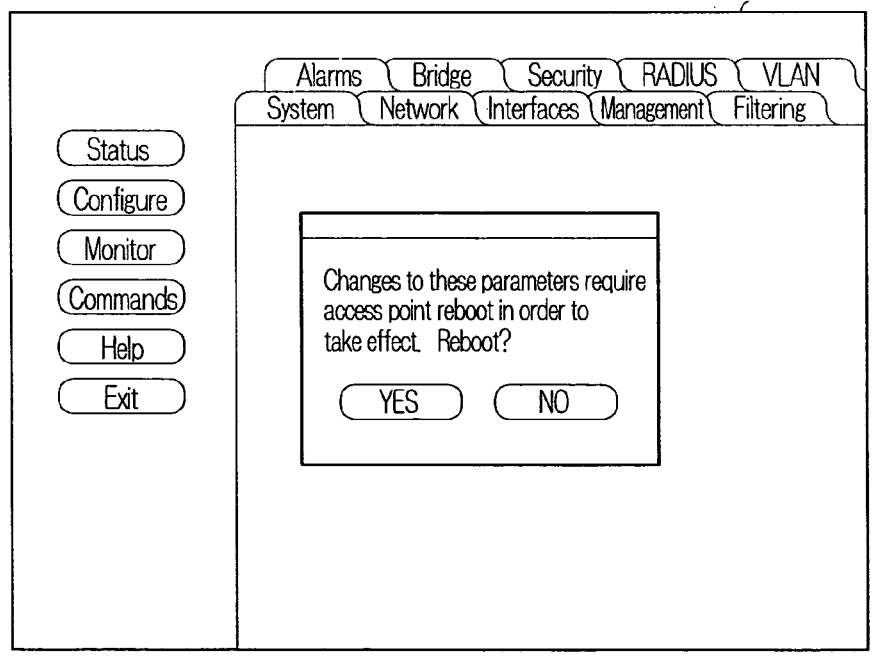
FIG. 8 is a schematic view illustrating the setup screen of the wireless LAN access point.

The CPU 32 then transmits a query signal for execution of a reboot process to the server computer 15. As shown in FIG. 8, the content of the query signal is displayed on the setup screen 47 in the server computer 15. The operator is recommended to execute the reboot process. When the operator clicks the "YES" button with input devices, the CPU 35 of the server computer 15 transmits a request signal for start of the reboot process to the wireless LAN access point 12 through the communication controller circuit 44. The CPU 32 receives the request signal from the server computer 15 in the wireless LAN access point 12.

The CPU 32 of the wireless LAN access point 12 subsequently starts monitoring the presence of a packet at step S3. Specifically, the CPU 32 operates to detect the presence of the communication establishment data 38 in the RAM 33 at step S4. Here, since the communication establishment data 38 is stored in the RAM 33, the CPU 32 determines that a packet is exchanged. When the CPU 32 determines the presence of a packet, the processing of the CPU 32 returns to step S3. The request signal is held in the CPU 32. Namely, the CPU 32 holds the reboot process. After a predetermined time period has elapsed, the CPU 32 again operates to detect the presence of the communication establishment data 38 in the RAM 33 at step S4. The CPU 32 thus repeats the processings of steps S3 and S4.

As described above, the communication establishment data 38 is erased from the RAM 33 after a predetermined time period has elapsed. The CPU 32 keeps detecting the presence of the communication establishment data 38 until the communication establishment data 38 is erased in the RAM 33. If the communication establishment data 34 is not held in the RAM 33, the CPU 32 determines that the communication is discontinued. The CPU 32 operates to execute the reboot process of the wireless LAN access point 12 based on the aforementioned request signal at step S5. The CPU 32 overwrites the setup data 37 in the nonvolatile memory 34 with the changed setup data temporarily held in the RAM 33. The wireless LAN access point 12 is thereafter shut down. The wireless LAN access point 12 then reboots. The reboot process is accomplished in this manner. The change of the communication channel takes effect. The CPU 32 then waits for a packet from the personal computers 14a, 14b and 14c and the server computer 15 at step S6. The wireless LAN access point 12 returns to the regular operations.

Next, assume that the communication establishment data 38 is not held in the RAM 33 in the wireless LAN access point 12. No packets are exchanged between the personal computer 14a and the server computer 15, for example. The operator boots up the web browser through manipulation of input devices in the server computer 15. The CPU 32 of the wireless LAN access point 12 transmits the setup screen data 36 to the server computer 15 through the communication controller circuit 28 at step S1. The setup screen 47 is displayed on the web browser in the server computer 15.

Subsequently, the operator operates to change various parameters and settings of the configuration on the setup screen 47 through manipulation of the input devices. As described above, the operator changes the communication channels, for example. The CPU 39 of the server computer 15 transmits the request signal for change of the communication channel to the wireless LAN access point 12 through the communication controller circuit 44. The CPU 32 operates to change the setup data in the wireless access point 12 in response to reception of the request signal at step S2. The CPU 32 temporarily stores the changed setup data in the RAM 33. Here, the existing setup data 37 is left unchanged in the nonvolatile memory 34. The communication controller circuit 28 utilizes the existing setup data 37 in transferring the packet until the existing setup data 37 is overwritten with the changed setup data.

The CPU 32 then transmits the query signal for execution of the reboot process to the server computer 15. The content of the query signal is displayed on the setup screen 47 in the server computer 15. The operator is recommended to execute the reboot process. When the operator requests the reboot process based on manipulation of input devices, the CPU 35 of the server computer 15 transmits a request signal for start of the reboot process to the wireless LAN access point 12 through, the communication controller circuit 44. The CPU 32 receives the request signal from the server computer 15 in the wireless LAN access point 12.

The CPU 32 of the wireless LAN access point 12 subsequently starts monitoring the presence of a packet at step S3. Specifically, the CPU 32 operates to detect the presence of the communication establishment data 38 in the RAM 33 at step S4. Here, since the communication establishment data 38 is not stored in the RAM 33, the CPU 32 determines that no packet is exchanged. When the CPU 32 determines the discontinuance of a packet, the CPU 32 operates to execute the reboot process of the wireless LAN access point 12 based on the aforementioned request signal at step S5. The CPU 32 overwrites the setup data 37 in the nonvolatile memory 34 with the changed setup data temporarily held in the RAM 33. The wireless LAN access point 12 is thereafter shut down. The wireless LAN access point 12 then reboots. The reboot process is accomplished in this manner. The change of the communication channel takes effect. The CPU 32 then waits for a packet from the personal computers 14a, 14b and 14c and the server computer 15 at step S6. The wireless LAN access point 12 returns to the regular operations.

The wireless LAN access point 12 allows the CPU 32 to monitor the presence of a packet or data prior to the execution of the reboot process of the wireless LAN access point 12. The reboot process is executed only if the discontinuance of data has been confirmed. Accordingly, data in a communication channel is reliably prevented from destruction. Moreover, the reboot process is automatically executed in the wireless LAN access point 12 as long as the operator simply transmits the request signal for reboot to the wireless LAN access point 12. The reboot process can be achieved with simple operations. The operator is allowed to leave the wireless LAN access point 12 before the data communications have been discontinued. The operator can finish the operation within the business hours. A burden of the operator can be lightened.

The CPU 32 of the wireless LAN access point 12 may transmit a signal for notifying the execution of the reboot process to the personal computers 14a, 14b and 14c in response to reception of the request signal for reboot. The transmission of the signal for notifying may be executed based on implementation of a predetermined software program. The signal for notifying may include a notification to request cessation of transmission of packets, the time when the reboot process starts, a time period taken for the execution of the reboot process, or the like, for example. The signal for notifying may also be transmitted to the server computer 15 at the same time.

The CPU 17 of the personal computer 14a, 14b and 14c receives the signal for notifying. The CPU 17 may display the content of the signal for notifying on the screen of the display apparatus in accordance with a predetermined software. The users of the personal computers 14a, 14b, 14c are allowed to finish transfer of a packet based on the indication included in the signal. Accordingly, the data communication can be reliably discontinued at the wireless LAN access point 12. The configuration of the wireless LAN access point 12 can be changed as planned.

Otherwise, the wireless LAN access point 12 may utilize a request signal for permission of communication and a corresponding permission signal so as to detect the presence of a packet. The request signal and permission signal are both periodically exchanged between the individual personal computers 14a, 14b, 14c and the wireless LAN access point 12. The communication controller circuit 28 may store in the RAM 33 the MAC address included in the request signal as the communication establishment data 38, for example. The wireless LAN access point 12 in this case reliably detects establishment of a link or communication with the personal computers 14a, 14b, 14c in executing the reboot process. The reboot process can be executed when a link is disconnected.

What is claimed is:

1. A relay apparatus comprising:
    a communication controller designed to relay data for communication, the communication controller providing communication establishment data specifying establishment of each communication; and
    a controller montoring presence of the communication establishment data when the controller receives a signal requesting start of a reboot process, the controller executing the reboot process when the controller detects completely no communication establishment data.

2. The relay apparatus according to claim 1, wherein said controller transmits a signal notifying execution of said reboot process.

3. The relay apparatus according to claim 1, wherein said controller holds the reboot process when it detects the communication establishment data, and said controller executing the reboot process when it detects no communication establishment data after it has held the reboot process.

4. A method of rebooting in a relay apparatus, comprising:
    monitoring presence of communication establishment data specifying establishment of each communication in the relay apparatus when a controller receives a signal requesting start of a reboot process; and
    executing the reboot process when the controller detects completely no communication establishment data.

5. The method according to claim 4, further comprising transmitting a signal notifying an execution of said reboot process.

6. The method according to claim 4, further comprising:
    holding execution of the reboot process when the communication establishment data is detected; and
    continuing to monitor the presence of the communication establishment data.

7. A computer-readable storage medium containing program instructions for causing a relay apparatus to:
    monitor the presence of communication establishment data specifying establishment of each communication in the relay apparatus when a controller receives a signal requesting start of a reboot process; and
    execute the reboot process of the relay apparatus when the controller detects completely no communication establishment data in the relay apparatus.

8. The computer-readable storage medium according to claim 7, further causing the relay apparatus to transmit a signal notifying execution of said reboot process to a terminal from the relay apparatus through a wireless communication network.

9. The computer-readable storage medium according to claim 7, further causing the relay apparatus to:
    hold execution of the reboot process when the comnmnication establishment data is detected in the relay apparatus; and
    continuing to monitor for the presence of the communication establishment data.

* * * * *